United States Patent [19]
Fischer

[11] Patent Number: 5,653,173
[45] Date of Patent: Aug. 5, 1997

[54] INDUCTION MOTOR MONORAIL SYSTEM

[76] Inventor: Phillip A. Fischer, 196 Colt La., Thousand Oaks, Calif. 91361-5201

[21] Appl. No.: 382,053

[22] PCT Filed: Aug. 14, 1992

[86] PCT No.: PCT/US92/06908

§ 371 Date: Feb. 10, 1995

§ 102(e) Date: Feb. 10, 1995

[87] PCT Pub. No.: WO94/04404

PCT Pub. Date: Mar. 3, 1994

[51] Int. Cl.⁶ .................................................. B61B 5/00
[52] U.S. Cl. ........................ 104/124; 104/118; 104/140; 104/281; 104/290; 105/141
[58] Field of Search ...................... 104/124, 125, 104/126, 139, 140, 292, 281, 282, 118, 290, 284, 138.1, 291, 143, 145; 105/141, 149, 165, 199.2, 453

[56] References Cited

U.S. PATENT DOCUMENTS

| | | | |
|---|---|---|---|
| 2,788,749 | 4/1957 | Hinsken et al. | 104/118 |
| 2,923,254 | 2/1960 | Barthelmess | 104/118 |
| 3,470,828 | 10/1969 | Powell, Jr. et al. | 104/148 |
| 3,525,306 | 8/1970 | Edel | 104/95 |
| 3,717,103 | 2/1973 | Guderjahn | 104/148 |
| 3,780,668 | 12/1973 | Schwarzler et al. | 104/148 |
| 3,892,185 | 7/1975 | Guderjahn | 104/148 |
| 4,175,224 | 11/1979 | Sims et al. | 219/60 |
| 4,347,791 | 9/1982 | Mandros | 104/156 |
| 4,995,320 | 2/1991 | Sato et al. | 104/118 |
| 5,027,713 | 7/1991 | Kindmann et al. | 104/124 |

FOREIGN PATENT DOCUMENTS

| | | |
|---|---|---|
| 1269666 | 10/1989 | Japan . |
| 658431A | 11/1986 | Switzerland . |
| 2209318 | 5/1989 | United Kingdom . |
| 9007963 | 7/1990 | WIPO . |

Primary Examiner—Mark T. Le
Attorney, Agent, or Firm—Poms, Smith, Lande & Rose

[57] ABSTRACT

A magnetic levitated vehicle, including a linear rotor connected thereto, runs on a tubular track having a circular cross-section and a tubular linear induction motor stator mounted therein. The rotor is movably mounted within the stator and the vehicle is positioned above the track. The rotor is connected to the vehicle by a riser extending through longitudinal slots of the track and stator, and by an actuator mechanism, which includes a transversely curved saddle movably connected to drive members, for enabling the vehicle to be banked at curve sections of the tubular track. Further, vehicle banking is also accomplished by constructing the track and stator with the slots laterally offset at the curved sections of the track.

37 Claims, 8 Drawing Sheets

INDUCTION MOTOR MONORAIL SYSTEM

BACKGROUND OF THE INVENTION

The present invention relates to tracked vehicle systems and more particularly concerns a vehicle system embodying a track guideway that has an upwardly convex transverse curvature.

Tracked vehicle systems generally embody a track structure including spaced rails particularly configured for support of vehicle wheels or other levitation arrangements. Magnetic levitation has been widely suggested, though less widely employed, for systems in which speeds may exceed those that are conveniently or safely attainable for wheeled vehicles. Particularly for high speed inter-city public transportation, magnetic levitation systems of various designs and configurations continue to be proposed. High speed trains provide advantages of easing overcrowded freeways and airports, reduction of pollution and facilitating mass transportation of riders between congested urban centers. Despite the many advantages of proposed high speed transport systems, few such proposals have been adopted. Among obstacles to widespread adoption of high speed transport systems are the track configuration, and, in particular, track system costs. Track configuration cross sections frequently include planes and surfaces for magnetic levitation extending in different directions, requiring complex structures needed to provide both lateral and vertical support. High speed magnetically levitated vehicle systems presently require high precision of track configuration and position, thereby greatly increasing cost of construction and maintenance. Such tracks must be carefully leveled and aligned, both longitudinally and transversely, often to small fractions of an inch.

Banking of such track structures at curved track sections is essential and becomes ever more important as speeds increase. As the vehicle travels along a curved track section, optimum lateral stability is achieved when the resultant of gravitational and centrifugal acceleration forces is perpendicular to the track surface. The direction of such resultant depends upon track curvature and vehicle speed, and thus, for a track of given curvature, the track has an optimum bank angle for any one speed. In present systems this bank angle is fixed when the track is constructed, and thus, for optimum operation, the vehicle must traverse such a banked curved section at a single predetermined speed. This may cause difficulties for a vehicle normally programmed for high speed operation on a track banked for such speed. Under certain circumstances the vehicle may be required to traverse a high speed curved section at a lower speed, or in some cases to stop at such section. In such a situation, not only is the tilt of the vehicle objectionable to passengers and freight, but it may increase the tendency of the vehicle to overturn, toward the inside of the curve. On the other hand, if the vehicle should run at too high a speed along a curve having too small a bank angle, centrifugal force becomes too large for the amount of bank and tends to laterally displace the vehicle outwardly of the curved track. Such forces, which can create dangerous situations, become of greater concern as vehicle speeds increase.

With a fixed bank angle, the track cannot properly handle both high speed passenger trains and slow, heavily laden freight trains. If the track curves are banked for high speed the heavy freight train may be required to traverse such curves at a speed higher than optimum, thus paying an economic penalty in fuel costs to overcome increased drag at the higher speeds.

Accordingly, it is an object of the present invention to provide a tracked vehicle system in which above-mentioned problems are avoided or minimized.

SUMMARY OF THE INVENTION

In carrying out principles of the present invention in accordance with a preferred embodiment thereof, a tracked vehicle system has a track that includes a longitudinally extending guideway having an upwardly convex transverse curvature. A vehicle is Supported on the guideway for longitudinal and transverse motion relative to the track. The vehicle is banked as it travels along the curved track section by positioning the vehicle transversely around the guideway toward an inward side of the track curve. According to one feature of the invention, the track is formed as a tube of circular cross section, having a guide slot at an appropriate point and carrying the tubular stator of a linear induction motor or a linear synchronous motor within the track tube, which stator itself has an elongated slot in registry with the track tube guide slot. A rotor of the motor is mounted within the tubular stator and includes a riser extending upwardly through both slots to a transversely curved drive arm on which a transversely curved saddle is mounted for transverse rotation about the center of curvature of the track. A vehicle supported on the saddle is thus driven by the thrust imparted to the saddle from the rotor and may be rotated as required by track longitudinal curvature and vehicle speed so that the resultant of gravitational and centrifugal acceleration is directed toward the center of transverse curvature of the track. Alternatively, or in addition to the transverse saddle rotation, banking can be partially or entirely accomplished by laterally shifting location of the slots in the guide tube and stator.

DETAILED DESCRIPTION

Figure 1:
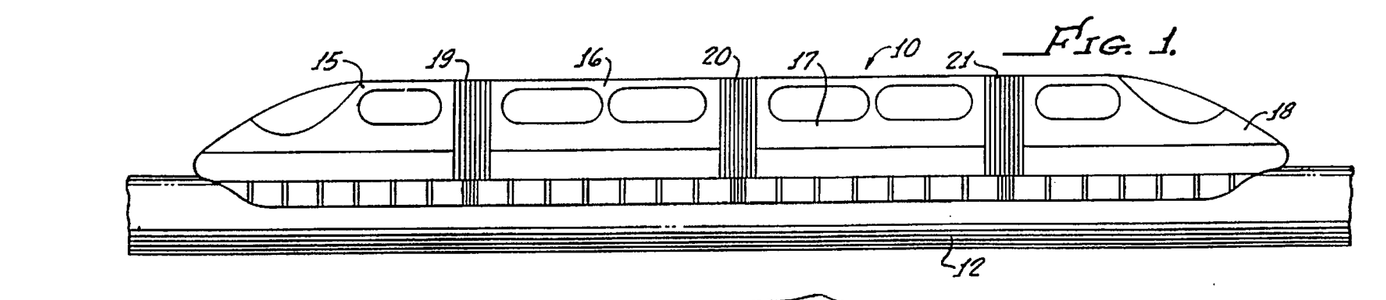
FIG. 1 is a side elevational view of a section of a track and vehicle embodying principles of the present invention.
Figure 2:
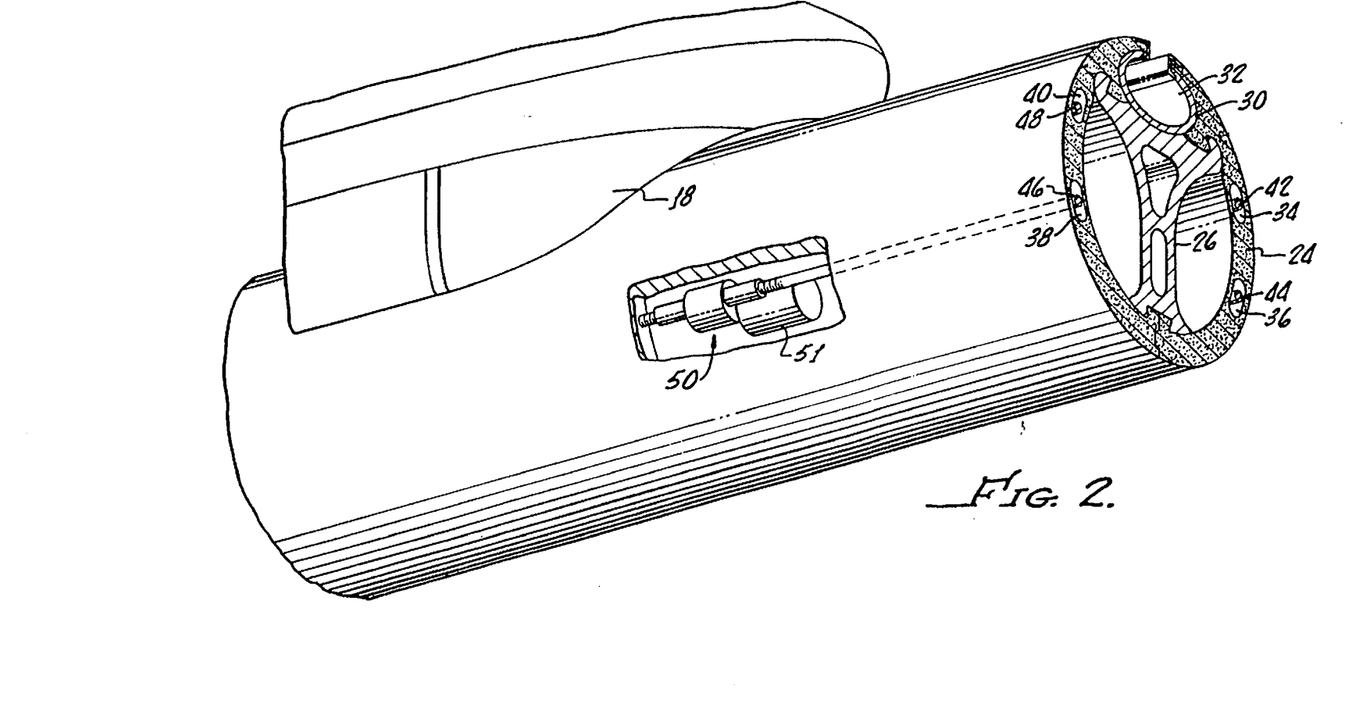
FIG. 2 is a fragmentary pictorial view, partly in section, showing some details of the tubular track.
Figure 3:
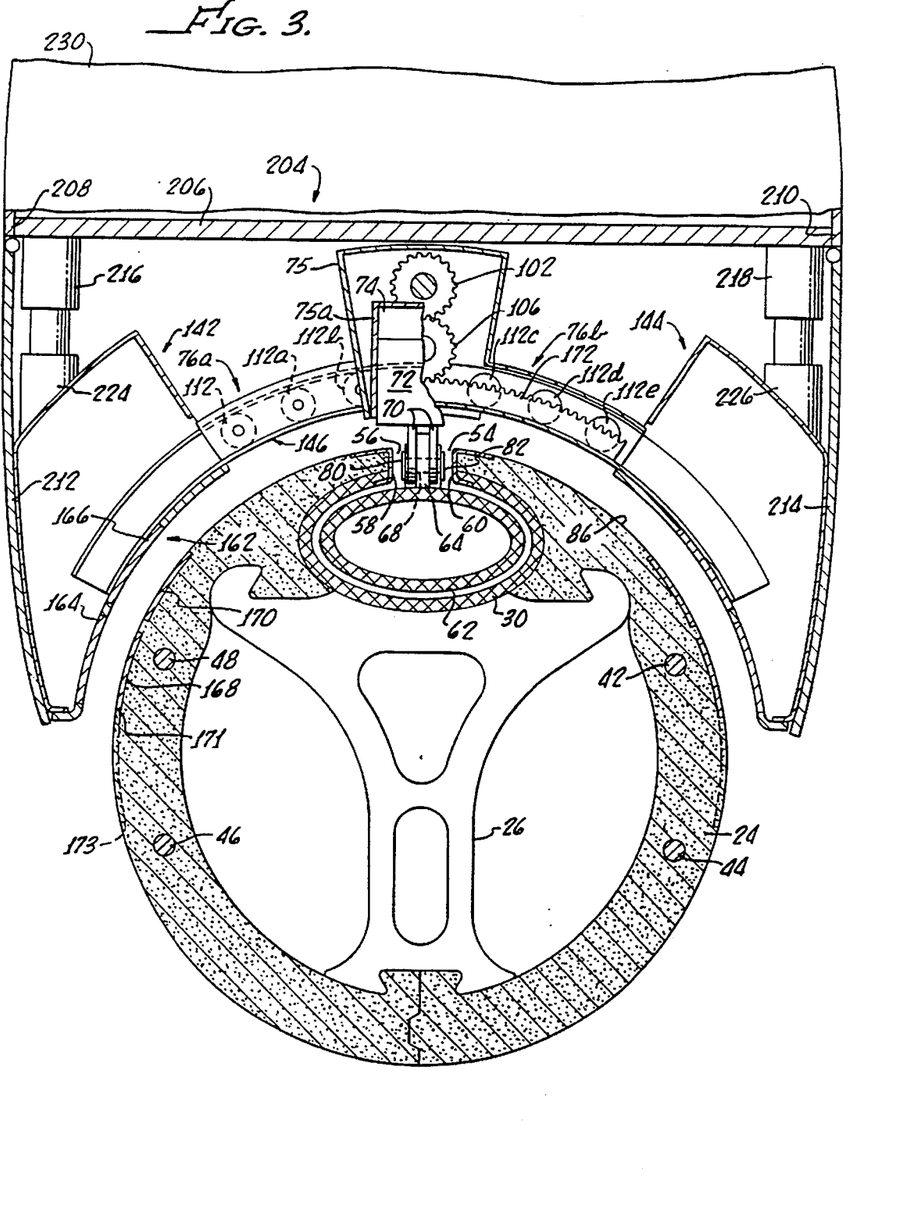
FIG. 3 is a transverse cross section through the track and saddle.

Illustrated in FIG. 1 is a magnetically levitated monorail vehicle system in which a vehicle, such as a passenger coach 10, is mounted on a tubular track 12 that is supported on a number of spaced columns 14. The coach may be of any length, such as, for example, a twenty foot long coach, or may be of greater length, as illustrated, formed by a plurality of sections 15, 16, 17 and 18, interconnected and articulated to one another at flexing joints 19, 20 and 21. The track is formed of an elongated tube, preferably of circular cross section as illustrated in FIGS. 2 and 3, having a relatively thick tubular wall 24. A presently preferred track configuration includes a vertically oriented diametral inner brace 26 extending the entire length of the track, at the upper end of which is formed, completely within the interior of the tubular track wall 24, a tubular stator 30 having stator coils (not shown) on an inner surface 32 thereof. The tubular stator extends the full length of the track and forms a fixed portion of a linear induction or linear synchronous motor, including a driven linear rotor, to be described below, but not shown in FIG. 2. The track structure may be formed of suitably reinforced concrete or any one of a number of resin impregnated fibers, including graphite, glass, and boron. Fibers of bamboo may also be employed, requiring a track having a thicker wall because of the somewhat lesser strength of bamboo fiber. The tubular track may also be made by various well known filament winding techniques to provide increased strength with relatively light weight.

A plurality of longitudinally extending cable slots, such as those designated by reference characters 34, 36, 38, 40 are circumferentially spaced around and formed in the tube wall 24 to receive longitudinally extending tension cables 42, 44, 46, 48 which are fixed at longitudinally spaced points (not shown) to the tube wall. Each cable is adjustable in length (between its fixed points) by suitable adjusting means, such as a turn buckle arrangement illustrated at 50. Adjustment of the length of each cable individually is accomplished to provide alignment and realignment of the tube 24 as may be necessary or desirable. Although four tension cables are illustrated, it will be readily understood that other numbers of cables may be employed. The adjusting turn buckles are accessible through suitable openings formed in the tube wall, and may be operated by a motor 51.

As can be seen in FIG. 3, the stator 30 has an elliptical cross section, although it will be readily appreciated that circular or other cross sectional shapes of the stator may be employed. The tube wall 24 has an opening at its top, providing a guide slot 54 which extends in a vertical plane along the entire length of the track, at the uppermost part of the tube. The stator 30, which is in part supported by and fixedly secured to the inner diametral brace 26, also has a slot 56 at its upper end in alignment with the guide slot 54. Sides of the aligned slots are lined with fixed channel shaped protective and brake members 58, 60 on either side of both slots.

A superconducting rotor 62, having an external configuration congruent with the inner surface of stator 30, is carried within the stator so that its outer surface is slightly spaced inwardly from the inner surface of the stator. The stator and rotor, except for the tubular configuration illustrated in FIG. 3, form parts of a known type of linear induction or linear synchronous motor which operates in a conventional fashion by means of a traveling magnetic field that is generated when the stator coils are energized and which reacts with a magnetic field induced in the rotor 62 to generate interacting magnetic fields to drive the rotor longitudinally along and within the stator. Magnetic interaction of the stator and rotor serve to maintain the spacing between these motor elements. A plurality of rotors 62 are connected end to end along the length of each vehicle, as shown in FIG. 7.

Figure 4:
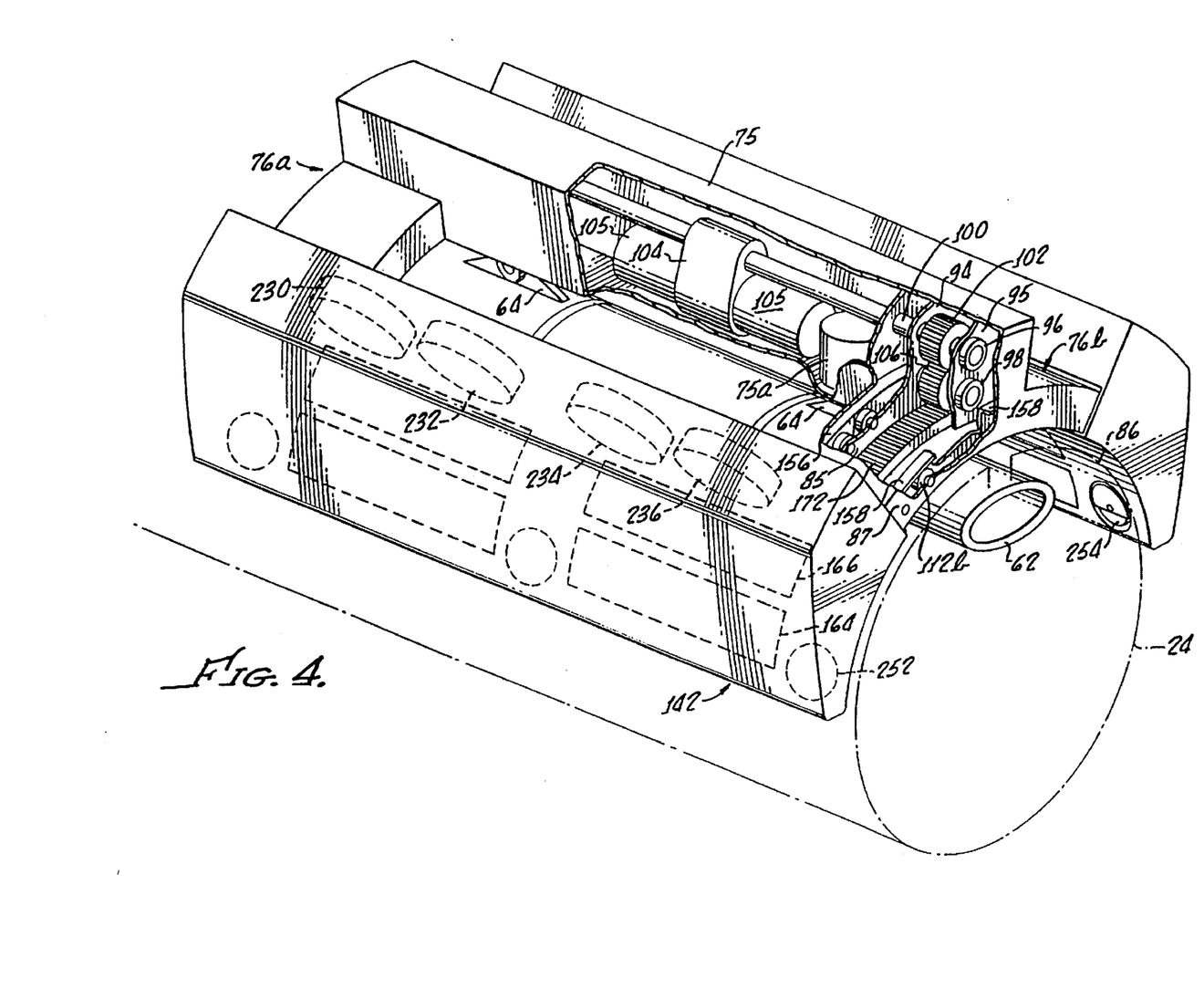
FIG. 4 is a pictorial view, with parts cut away, showing saddle structure.

Each rotor 62 has a limited length and is connected by a universal joint 63 (FIG. 7) to an additional rotor so that each vehicle may be propelled by two or more rotors. Adjacent an end of at least alternate rotors near the junction between adjacent rotors, is fixed a riser generally indicated at 64 in FIG. 7. Each riser is connected by a pin 68 to a yoke 70 carried at the end of a shaft 72 of a piston mounted in a fluid filled damper cylinder 74. The cylinder 74 is fixedly connected to a cylindrical damper mounting housing section 75a that is an integral part of a rigid longitudinally extending riser drive housing structure 75 (FIGS. 3, 4, 7). Housing structure 75 fixedly carries at its opposite ends two substantially identical curved, transversely extending drive arms generally designated at 76a, 76b (FIGS. 3 and 5). Riser brake supports 78 are fixed to the top of the rotor between the risers and carry laterally outwardly expandable brake pads 80, 82 (FIGS. 3, 7 and 8) that are outwardly driven by a suitable drive (not shown) to engage the fixed brake surfaces 58, 60 lining slots of the track tube and stator.

Drive arms 76a, 76b are laterally fixed parts of the transverse drive housing structure that is fixed to the risers. Each has a circularly arcuate transverse shape, as can be seen in FIG. 3, being curved about the center of curvature of the track and concentric therewith. Each drive arm is of roughly inverted U-shape in section, having a top wall 83 and four transversely spaced depending bearing support walls 84, 85, 86, 87 (FIG. 6).

Figure 7:
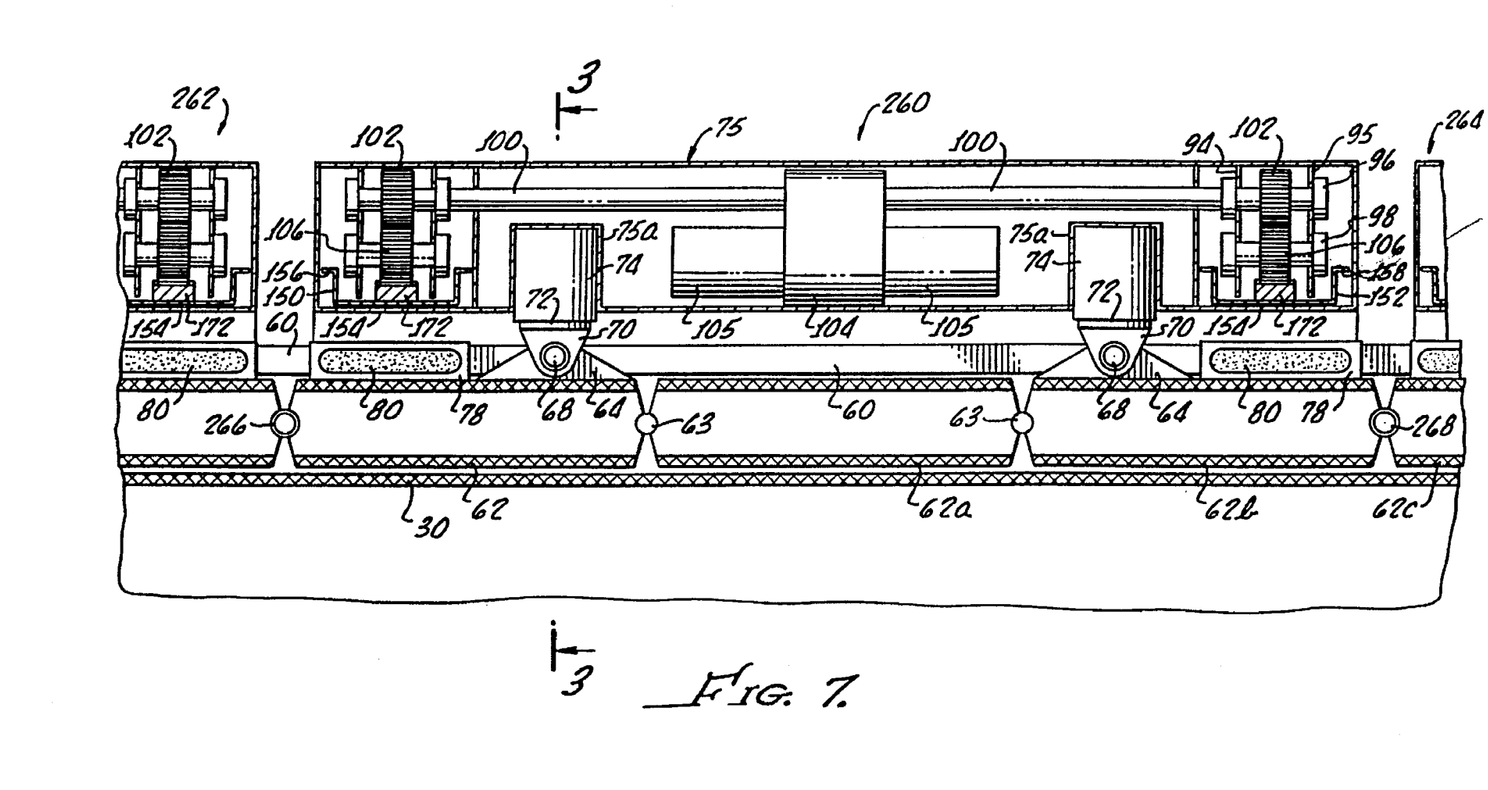
FIG. 7 is a longitudinal section showing details of riser connections and connections between drive units.

A central portion of housing structure 75 fixedly carries first and second mutually longitudinally spaced transversely extending vertical side elements 94, 95 (FIGS. 4 and 7). Side elements 94, 95 have bearing apertures lined with vertically spaced bearing sleeves 96, 98. Sleeve 96 rotatably receives a longitudinally extending pinion drive shaft 100 having a drive gear 102 fixed thereon. The drive shaft is connected to the output of a gear drive housing 104 having an input from a pair of pinion drive motors 105 that are mounted in housing structure 75. A pinion gear 106, mounted in bearing 98 (and in a companion bearing, not shown, in side element 94) is in driven engagement with drive gear 102. The drive housing structure has identical transverse arms, gear drives and related support and drive structure at both ends, as shown in FIG. 7. Alternatively, instead of gear drives, hydraulic rams can be utilized to transversely rotate the outrigger assemblies about the axis of the track.

Thus it will be seen that the drive arms 76a, 76b and drive housing structure 75 are fixedly mounted to the rotors and are driven longitudinally along the track tube 12, together with the rotors.

Figures 5, 14:
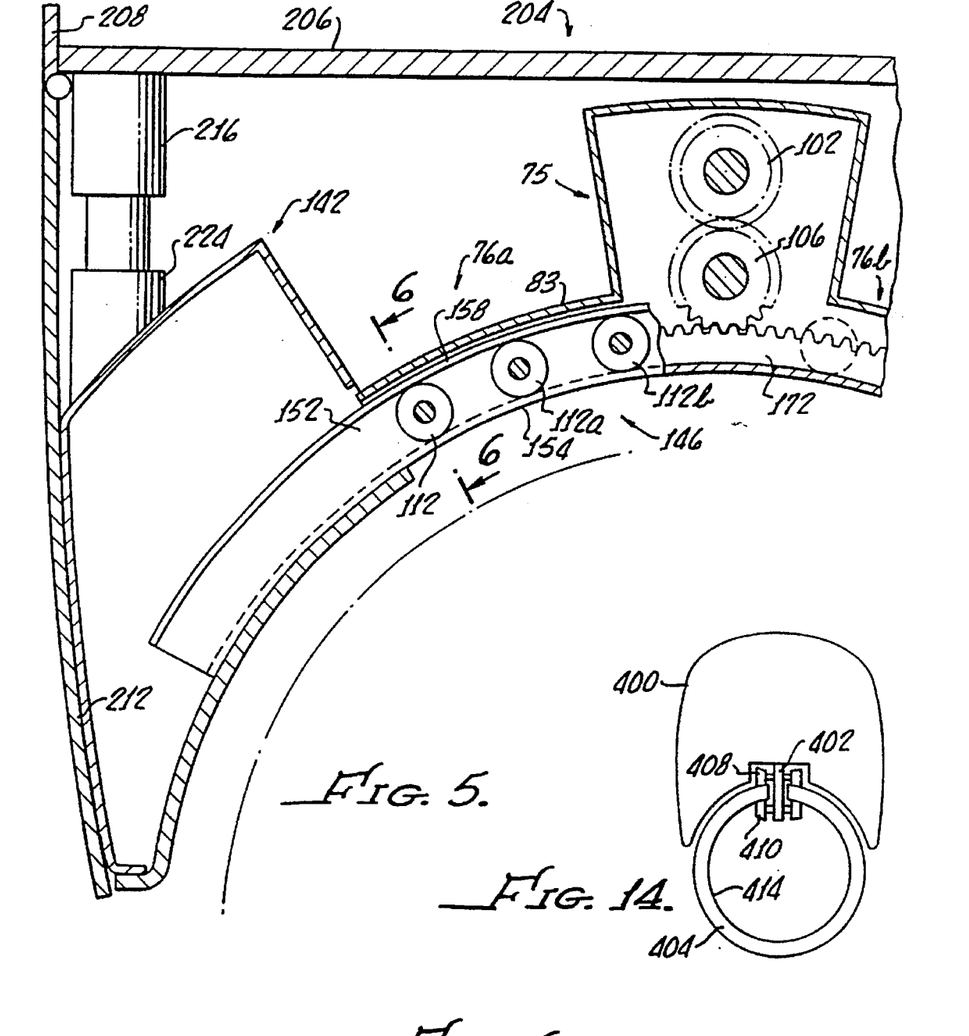
FIGS. 5 and 6 are sectional views showing the roller mounting of the transversely shiftable saddle upon the riser driver housing.
FIG. 14 illustrates a small scale model system employing wheels both inside and outside the track.
Figure 6:
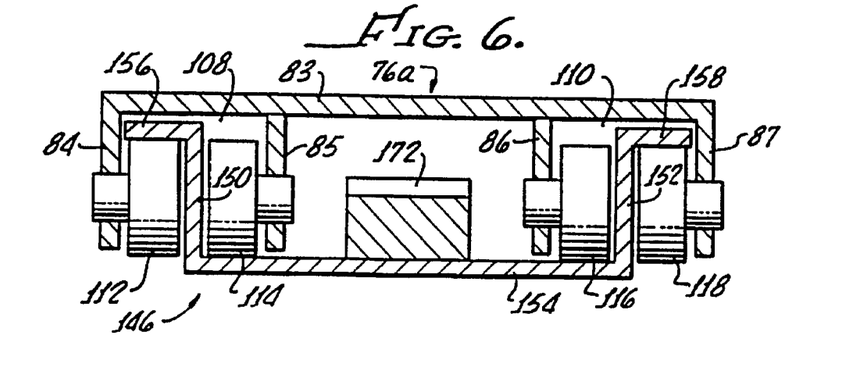

Referring to FIGS. 5 and 6, bearing support walls 84–87 of drive arm 76a form downwardly opening channels 108, 110 which mount axially aligned pairs of mutually spaced rollers 112, 114 in one channel and 116, 118 in the other. The pairs of rollers are longitudinally spaced from one another and journaled on mutually aligned axes extending longitudinally of the track. The rollers are journaled in opposite downwardly extending side walls 84–87 of the channels 108, 110 respectively. For each of the drive arms 76a, 76b there are three transversely spaced sets of rollers, as shown at 112, 112a and 112b in FIG. 3 for drive arm 76a and roller sets 112c, 112d, 112e for drive arm 76b.

A transversely shiftable saddle structure is movably mounted to the drive housing structure 75 and, as best seen in FIGS. 3, 4, 5 and 6, includes a pair of mutually circumferentially spaced structurally rigid outriggers 142, 144 rigidly interconnected by a transversely extending circularly curved outrigger transverse bridge 146. The outriggers are formed by rigid structures that extend longitudinally on both sides of housing structure 75 and are transversely spaced therefrom. Each has a curved lower support surface 162 that is congruent with the curved track surface. The saddle structure is arranged to receive the longitudinal thrust of the rotor imparted through the drive arms 76a, 76b and is mounted to the drive arms for transverse shifting, or, more specifically, for transverse rotation relative to the drive arms about the center of curvature of the guideway surface 86. Outrigger transverse bridge 146 has a central section between the outriggers that is basically channel shaped in cross section, as can be best seen in FIG. 6, and includes upstanding lateral walls 150, 152 interconnected by a bottom web 154 that fixedly extends between the side walls. The upper ends of the side walls terminate in lateral outwardly projecting flanges 156, 158 which rest upon outer rollers 112, 118 respectively. Inner rollers 114, 116 are in rolling contact with the upper surface of the web 154. Web 154 fixedly carries an arcuate transverse rack 172 that is in driven engagement with gear 106. The saddle and drive housing structure have the same transverse curvature as the track. Thus the outrigger transverse bridge is supported on the rollers for transverse rotation relative to the drive housing structure about the center of tubular guide track when driven by the rack 172 and gear 106.

Assuming the rotors are driven toward the right, as viewed in FIG. 7, rotor thrust is transmitted via the risers 64 to longitudinally drive the drive arms 76a, 76b of the saddle. Longitudinal thrust on the drive arms is transmitted via the rollers 112-118 to longitudinally drive the outrigger transverse bridge 146 of the saddle structure.

Each outrigger, such as outrigger 142, extends longitudinally of the track from one end of the housing structure to the other and includes a lower surface 162 (FIG. 3) having inner and outer magnetic levitation coils 164, 166 which cooperate respectively with electrically conductive plates, such as aluminum plates 168, 170 fixed to outer surfaces of the guide tube. Center portions of the plates are radially aligned with respective magnetic levitation coils 164, 166 when the saddle structure is transversely centered. The circumferential extent of the conductive plates 168, 170 is greater than the circumferential extent of the levitation coils 164, 166 to accommodate transverse rotation of the saddle. As will be more particularly described below, where significant transverse motion, as for banking on a curve, is expected, the conductive plates 168, 170 are continuous circumferentially for a sufficiently large distance outwardly of each side of the track guide and stator slots 54, 56. Each outrigger 142, 144 is identical to the other, except that the two are of opposite hand, and each at its inner end is fixedly connected to an outer end of the outrigger transverse bridge 146. By means of the transversely extending rack 172, gears 102, 106 and motors 105 (FIGS. 4 and 5), the outrigger transverse bridge 146, together with outriggers 142, 144, are transversely rotated about the axis of the track 24.

A car support platform 204 (FIGS. 3 and 5) includes a nominally horizontal transverse support structure 206, having depending walls 208, 210 to which are secured car skirts 212, 214, having their lower ends closely adjacent to but relatively movable with respect to the lower outermost ends of outriggers 142, 144. Car support platform 204, is mounted to the outriggers by means of pairs of pneumatic suspension cylinders 216, 218 or other pneumatic suspension units that are secured to mounting pads 224, 226 that are fixedly carried by the outriggers. Identical pneumatic suspension arrangements 216 through 226 are located at each end of each outrigger. In a presently contemplated alternative arrangement suspension units 216, 218 are replaced by air bag or air spring units that provide full vertical, lateral and longitudinal location of the outrigger assemblies. A vehicle body 230 of suitable size and configuration is fixedly mounted to the car support platform 204.

Figure 8:
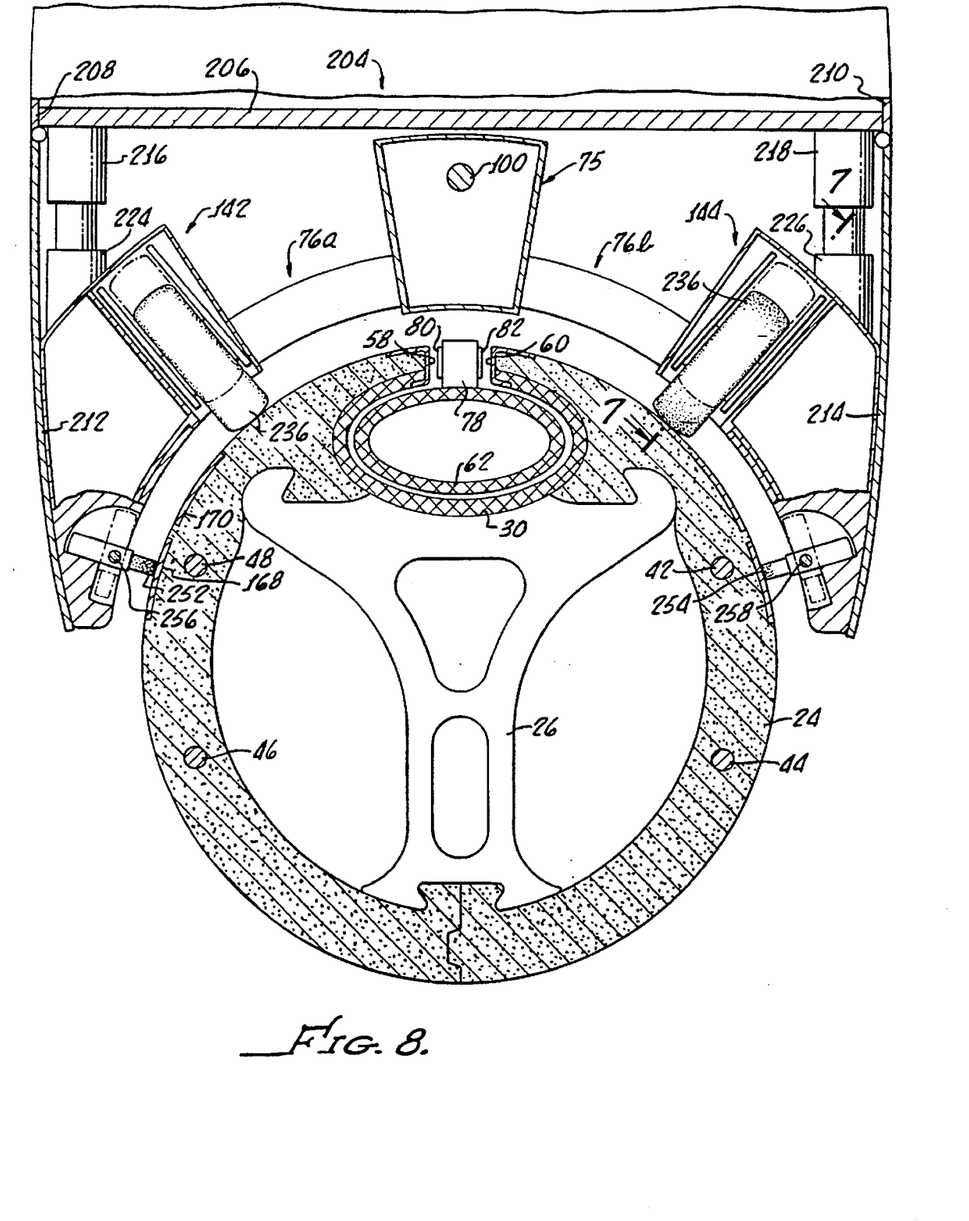
FIGS. 8 and 9 are transverse and longitudinal views illustrating retractable support wheels.
Figure 9:
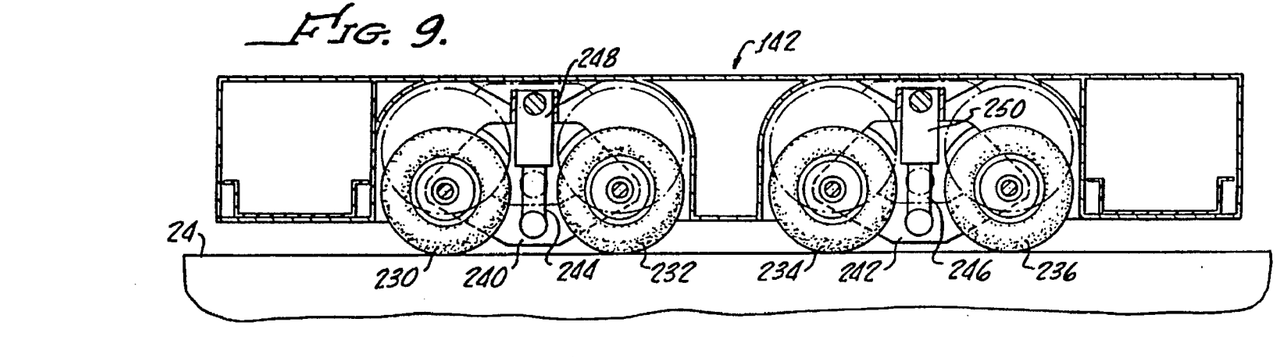

Retractable wheels are provided to support the saddle structure from the track at low speeds and when the vehicle is stationary. Upon attainment of a suitable higher speed the wheels are retracted and the vehicle is supported magnetically. To this end, wheels, such as wheels 230, 232, 234 and 236 (FIGS. 8 and 9) are mounted in pairs to wheel brackets 240, 242, which are carried by driven shafts 244, 246 of hydraulic cylinders 248, 250. The latter are fixedly carried by the saddle structure between the transverse bridges 146 at each end of the saddle structure. If deemed necessary or desirable, auxiliary guide wheels 252, 254 (FIG. 8) are mounted to outer ends of the outriggers on a suitable yoke structures (not shown) for pivotal motion about longitudinally extending axes 256, 258 between retracted and supporting positions, as illustrated in FIG. 8. Accordingly, the vehicle, including the car support platform and outriggers, and also the driver arm, and thereby the rotor, may be supported from the guide tube by contact of the wheels 230, 232, 234 and 236, with the outer surface of the guide tube when the wheels are extended for low speed operation of the vehicle. In normal high speed operation, all wheels are retracted.

FIG. 7 illustrates the longitudinal interconnection of a number of drive units for an individual vehicle. Depending upon the length of the vehicle it will have two or more interconnected drive units, each drive unit including a plurality of rotors (62, 62a and 62b of one drive unit in FIG. 7), and a transversely shiftable saddle structure, as previously described. FIG. 7 shows one drive unit 260 connected at each of its ends to similar drive units 262, 264 of which only end portions are shown. The individual drive units are hingedly connected to one another by universal joint connections 266, 268 to facilitate passage of the vehicle along sharper curved sections of the track. Within each drive unit the three rotors are pivotally interconnected with each other, as indicated at 63. Thus, as illustrated in the somewhat schematic showing of FIG. 7 (certain parts of the vehicle and certain parts of the saddle structure and guide tube are not shown in this figure), a first or forward drive unit 264, including a rotor 62c and saddle structure, as previously described, is connected at one end of the rotor via a flexible coupling 268 to one end of a similar rotor 62b of a second identical drive unit 260.

Figure 10A:
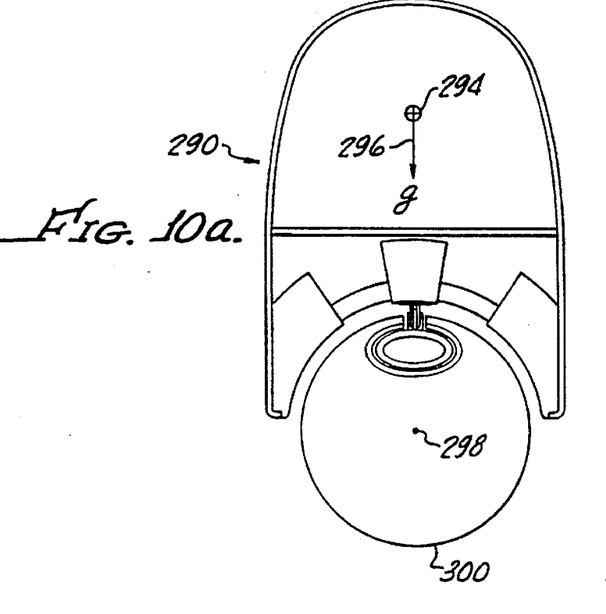
FIGS. 10a, 10b and 10c are schematic illustrations showing the banking of the vehicle by rotation about the center of track curvature.
Figure 10B:
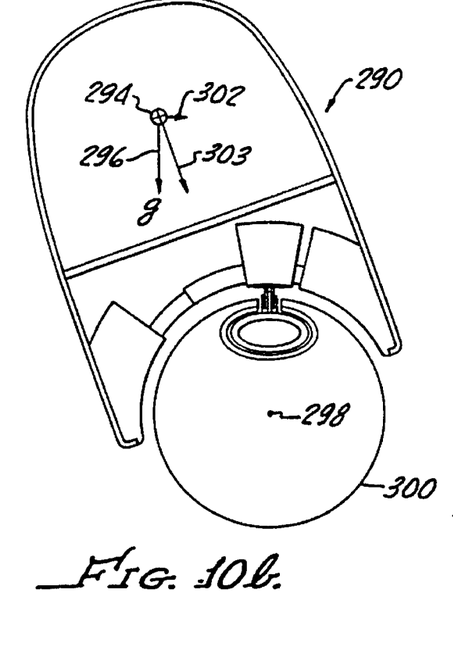
Figure 10C:
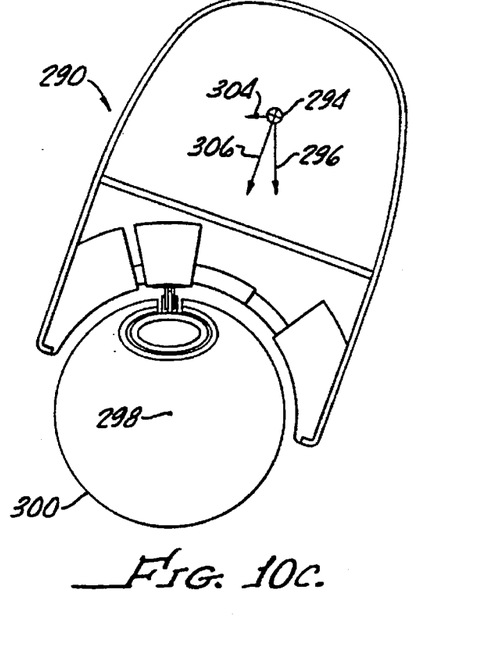

FIGS. 10a, 10b and 10c schematically illustrate transverse rotation for banking of the vehicle during traverse of straight and curved track sections, where track slots on both straight and curved track sections are positioned at the uppermost midpoint of the track tube. FIG. 10a illustrates a vehicle 290 on a straight section of track wherein the force of gravity acting on the car center of gravity 294 is directed vertically downwardly, as indicated by arrow 296, toward the geometric center 298 of the guide tube 300.

Consider, in the illustration of FIG. 10b, that the vehicle is moving away from the viewer into the plane of the paper on a track that is curving toward the left, away from the viewer. The vehicle and its saddle are rotated (banked) about the track center 298 to compensate for the laterally directed centrifugal acceleration acting on the car during its traverse of the curve, such acceleration being indicated by the vector 302. The gravitational acceleration vector 296 remains the same so that the resultant of the two accelerations, indicated at 303, with optimum rotation of the car for banking, is directed along a line intersecting the geometrical center 298 of the track. Thus the resultant of forces of the car on the track is directed radially of the circularly curved track tube and perpendicular to the guideway formed by the tube outer surface.

Similarly, as indicated in FIG. 10c, the car is shifted toward the right as viewed in this figure when traversing a curved Section of track that turns toward the right as the vehicle moves away from the viewer to compensate for the centrifugal acceleration 304, which combines with the gravitational acceleration 296 to provide a resultant acceleration 306 which is directed through the center of curvature 298 of the track section. It is presently contemplated that saddle structure and transverse rotation will allow rotation of as much as twenty degrees to either side of the straight track section position illustrated in FIG. 10a. Obviously other limits of rotation may be employed. Of course the preferred amount of transverse rotation depends upon both curvature of the track section and vehicle speed.

Figure 11:
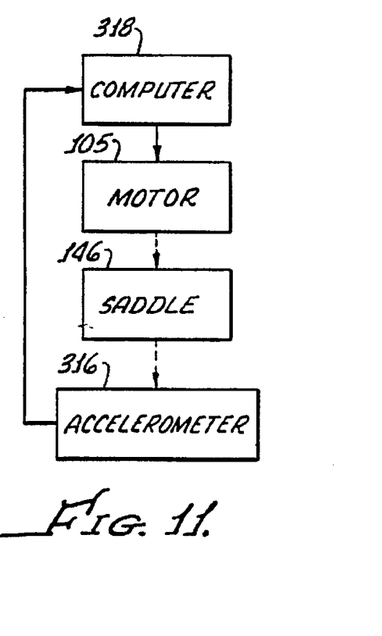
FIG. 11 is a block diagram of an acceleration based banking control.

The pinion drive motor 105, which drives transverse rotation of the vehicle and saddle for banking, may be controlled by any one of a number of different automatic systems or manually. For example, an acceleration sensing system will sense centrifugal acceleration experienced by the vehicle as it traverses the curve and the necessary angle of transverse rotation is computed as a function of the sensed centrifugal acceleration and gravitational acceleration g. Such a system has maximum flexibility in that neither the degree of curvature nor the speed of the vehicle need be previously known or programmed. Proper banking is achieved by transverse rotation of the saddle to a point where the resultant acceleration is directed toward the center of the track and thus is precisely perpendicular to the guideway surface that supports the saddle and vehicle. FIG. 11 is a simplified block diagram of one such closed loop bank angle control system. Centrifugal acceleration is sensed by an accelerometer 316 on the vehicle, sends a signal to a computer 318, which generates a drive signal for the pinion drive motor 105 to drive the vehicle and its saddle around the track to the appropriate bank angle. In an alternative control (not shown) a pendulous accelerometer on the vehicle will sense the resultant of gravity and centrifugal acceleration and generate a signal to drive the pinion motor 105 and tilt the vehicle to a null position in which the resultant of gravity and centrifugal acceleration is directed to the center of the tubular track.

As previously mentioned, the magnetic or electrically conductive levitation plates 168, 170 which extend longitudinally for the full length of the guide tube are generally radially aligned with each of the magnetic coils 164, 166 of the outriggers and may have somewhat greater circumferential extent to accommodate a small amount of rotation of the vehicle and saddle for straight or generally nearly straight track sections. For curved sections, where a greater amount of rotation is expected, plates 168 and 170 are replaced by a single circumferentially extending plate extending on both sides of the guide tube slot from a point adjacent the slot to a point 173 that may be twenty degrees further around the circumference of the guide tube than the point shown in FIG. 3 for the distal edge 171 of plate 168. Edge 171 is most distant circumferentially from the slot for a straight track section. For a curved track, the saddle and its outrigger may rotate twenty degrees in one direction or the other from the position illustrated in FIGS. 3 and 10a to the position shown in FIGS. 10b and 10c. Thus, on curved track sections, the conductive levitation plates 168, 170 are suitably extended circumferentially to enable the magnetic levitation to function even as the vehicle and saddle are transversely rotated. Preferably, at least the magnetic levitation coils are super conductive for increased magnetic efficiency.

Various other arrangements for controlling banking of the vehicle and actively driving transverse rotation of the proper amount are readily available. Gyroscopes mounted on the vehicle may be employed for lateral stabilization. Pendulous acceleration sensing gyroscopes may be employed to control the pinion drive motors 105 and thereby actively accomplish transverse rotation to the proper bank angle.

A computer aboard each vehicle may be employed for control of tilt. Thus the radius of curvature of each curve is known and the sequence of curves is known and programmed into the computer, or curvature of individual curves of the track may be sensed as the vehicle approaches to provide information to a computer concerning the degree of curvature of each individual curve. In such an alternate arrangement a suitable speed sensor on the vehicle provides a second input to the computer which produces a transverse rotation drive signal as a function of the known (or measured) curvature of the track section and the sensed vehicle speed. The drive signal is fed to control the pinion drive motor on the vehicle to accomplish the desired optimum rotation of the vehicle and saddle as previously described.

It will be seen that the described system, unlike prior systems, does not require any pre-constructed fixed banking of the track so as to cause the track itself to provide banking for a vehicle traveling at only a single preselected speed. To the contrary, the system described herein enables the track to be built with no banking whatsoever, and yet the vehicle itself may be properly banked at different curves and at any reasonable speed. Moreover, the system will operate to enable a vehicle to stop or move slowly on a sharp curve without uncomfortable or dangerous inclination of the vehicle or causing the vehicle to be subject to the tendency to overturn. Should the vehicle stop on a curve, suitable sensors (not shown) will sense the track curvature (or vehicle tilt and velocity) and rotate the saddle and vehicle until the resultant acceleration experienced by the vehicle, which is only the gravitational acceleration when the vehicle is at rest, is again directed through the center of curvature of the tube, thereby rotating the saddle and vehicle to an upright position.

The described banking system provides this tracked vehicle with great flexibility in handling different modes of transportation on the same track. For example, the track may handle a very high speed passenger vehicle which requires a high degree of banking on sharp curves, and yet at other times the same track will readily handle a slower vehicle, such as a slow freight vehicle, that is not capable of successfully negotiating a curved track section that is sufficiently banked to accommodate the high speed passenger vehicle. In the present arrangement no banking of the track is required. It is the vehicle, not the track, that is banked appropriately on demand. Banking of the vehicle is automatically varied on demand in accordance with the degree of track curvature and vehicle speed.

Figure 12:
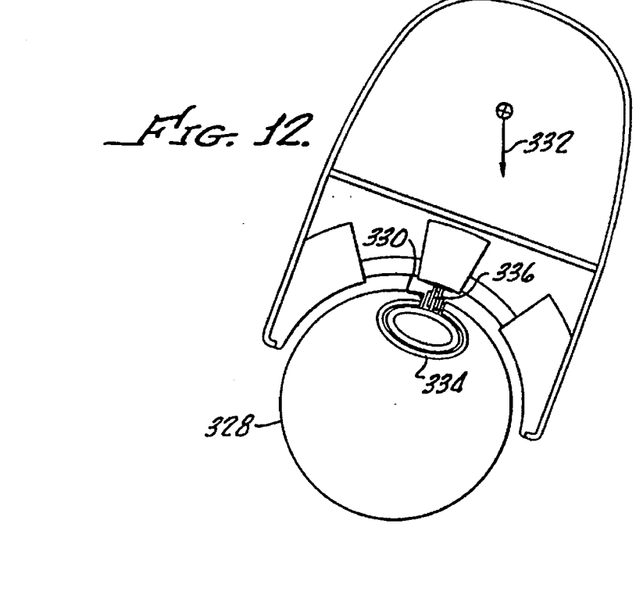
FIG. 12 is schematically depicts a track and saddle, illustrating banking of the vehicle by tilted or transversely displaced slot arrangement.
Figure 13:
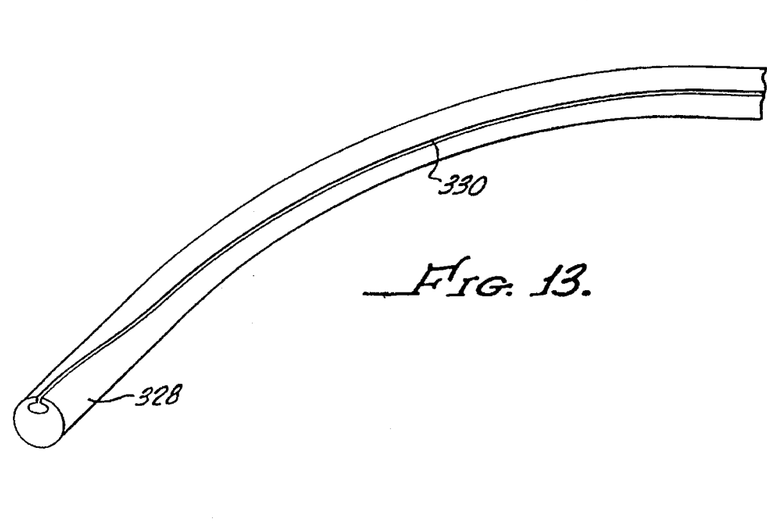
FIG. 13 illustrates a portion of a tubular track having its guide slot laterally displaced at a curved section.

Although a significant advantage of the present system is its ability to enable a high speed vehicle to negotiate sharp curved track sections without any type of pre-banking of the track itself, the present system is nevertheless capable, with slight modification, of providing a tracked system in which the track itself controls a fixed predetermined amount of vehicle banking. Such fixed or track banking may be supplemented if desired by additional transverse rotation of the vehicle and its saddle. Thus, as illustrated in FIGS. 12 and 13, a tubular track 328 which is identical to that previously described (except for its slot position) has its slot 330 circumferentially offset from the vertical for curved sections of the track. For straight sections, of course, the slot is still at the uppermost part of the tube as previously described in connection with the embodiments of FIGS. 1 through 10. The guide slot 330 of the track tube, and the slot of the stator 334, which is still registered with the tube slot, are offset together. The riser 336 of the rotor 338 is also offset to extend through both slots. Consequently, the rotor and all parts driven thereby (including the saddle and the car) are automatically tilted by the configuration and positioning of the stator and rotor. As the slots tilt (are positioned at a circumferentially shifted position) for a curve along the length of the track, the slot sides contact the riser and shift the riser and structure carried by the riser so as to maintain the riser aligned in both slots. The rotor is magnetically supported within the stator as previously described, and, as the positions of the stator together with its rotor are laterally shifted in accordance with the desired built-in banking of the track, the rotor, riser and therefore saddle and vehicle are automatically laterally displaced on those curved sections at which the stator, rotor and guide slot are likewise circumferentially offset. Effectively, the slot operates as a vehicle guide, and the riser, which is fixed to the vehicle, operates as a guide follower to keep the vehicle centered over the track slot. If circumstances permit vehicle speeds to be fixed or predetermined at all times, the vehicle and its supporting saddle need not be transversely rotated for any additional banking. In fact, in some situations where circumferentially offset track and stator slots are employed for curved sections, no transverse saddle and vehicle motion need be provided, thereby decreasing complexity and cost of the vehicle. In some situations, all banking may be fixed in the track by positioning the track and stator slots laterally offset from a vertical diametral longitudinal plane of track. Nevertheless, even with the offset of stator and rotor on the curved sections, the system may use a vehicle and saddle that are still capable of transverse rotation to provide additional or decreased banking, as may be necessary or desirable.

Although the track (e.g. its supporting surface or guideway) described above has a circular section, it will be readily appreciated that other (non-circular) upwardly convex transverse curvatures may be employed for configurations of that portion of the upper surface of the track that mates with and magnetically supports the outriggers of the vehicle supporting saddle. It is only those portions of the upper surface of the track guideway (e.g. outer surfaces of aluminum levitation plates 168, 170) that require the upwardly convex transverse curvature that enables transverse tilting motion of the vehicle around the track.

For those configurations where the vehicle is banked solely by the position of the track and stator slots, as in FIGS. 12 and 13 (Sheet 7), there need be no saddle structure transversely shiftable around the track and, particularly for lower speeds, the vehicle may be supported entirely, at all times, by conventional wheels fixed to the vehicle and bearing upon the curved guideway. Such an arrangement particularly lends itself to use in small scale model or toy track vehicle systems. No magnetic levitation need be employed in such a configuration. Instead of a linear motor fixed to the track, any suitable type of conventional motor may be mounted in the vehicle to drive the wheels for vehicle propulsion. In such an arrangement, as illustrated in FIG. 14 (Sheet 4), although the stator and rotor of the induction motor are eliminated, the vehicle 400 is still fixedly connected to a riser 402 which projects from the vehicle downwardly into the slot formed in the track 404 to guide the vehicle along the track and to tilt the vehicle at track sections in which the slot is circumferentially offset from a longitudinal vertical plane through the track center. Further, in order to retain conventional outer wheels 408 of the vehicle on the track in contact with the guideway surface, a group of inner wheels 410 are rotatably carried by the lower end of the riser, entirely within the tubular track and bearing upwardly (radially outwardly) against the inner surface 414 of the tubular track. Inner wheels 410 are at all times resiliently urged radially outwardly by suitable mechanism (not shown) against the inner surface of the track to cooperate with a set of outer wheels positioned between the vehicle and the outer surface of the tracks, so as to resiliently clamp the track or grip the track between outer and inner sets of wheels. This gripping prevents "derailment" by keeping the vehicle from being detached from the track. Thus the tubular track allows the vehicle to be securely affixed to the track with minimum restraint on longitudinal motion.

In such toy model it will be appreciated that elliptical or multi-sided cross-sectional shapes utilizing any number of flat or curved faces may be utilized for the track guideway, instead of the circular cross-sectional shapes previously mentioned. In such an arrangement the slot in the guideway is angularly offset, being transversely or angularly displaced about an axis extending along a central portion of the track cross-section. Although the present arrangement shown utilizes a single slot with riser assembly connecting the wheels inside the guideway to the vehicle running on the outer surface, multiple slots and risers may be used to support the vehicle in like manner, and the tube interior may have single or multiple reinforcement webs.

I claim:

1. A tracked vehicle system comprising:

a track including a longitudinally extending guideway having an upwardly convex transverse curvature, said track having a longitudinally curved section, a vehicle having a center of gravity above said track, means for supporting said vehicle on said guideway with said center of gravity above said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section.

2. The system of claim 1 wherein said means for supporting comprises means for guiding said vehicle relative to the guideway in a transverse path having a curvature that matches said guideway curvature.

3. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, a longitudinal slot being formed in an upper portion of said guideway, and including a slot follower fixed to the vehicle and projecting into said slot.

4. The system of claim 3 wherein said slot is transversely offset from a longitudinally extending vertical plane through the center of said guideway at portions of said longitudinally curved track sections.

5. The system of claim 1 wherein said means for supporting comprises a saddle fixed to said vehicle and having a support surface adjacent said track guideway, said saddle being configured and arranged to support said vehicle on said guideway, said support surface extending transversely of said track and having a downwardly concave transverse curvature that matches the curvature of said guideway.

6. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, said means for supporting comprising a saddle fixed to said vehicle and having a support surface adjacent said track guideway, said saddle being configured and arranged to support said vehicle on said guideway, said support surface extending transversely of said track and having a downwardly concave transverse curvature that matches the curvature of said guideway, said means for propelling comprising a motor on said track having a drive member that is propelled along the track, and a longitudinal driving connection between said saddle and said drive member.

7. The system of claim 6 wherein said drive member is movably connected to said saddle for transverse motion of the saddle relative to said drive member.

8. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, said means for propelling comprising a linear motor secured to said track, said motor including a linear stator below said track and having a stator slot, said track having a guide slot in alignment with said stator slot, a linear rotor mounted to said stator to be driven along said stator and track, a riser fixed to said rotor and extending upwardly through both said slots, and means for connecting an upper portion of said riser to said vehicle.

9. The system of claim 8 wherein said slots are aligned in a direction inclined to the vertical at said longitudinally curved section of said track.

10. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, said guideway having a longitudinally extending slot, said means for propelling including a movable member mounted below said track and having a riser extending upwardly through said slot, a drive member fixed to said riser above said track, and means for connecting said drive member to said vehicle, said slot being laterally displaced from a surface extending vertically through the center of said track at said longitudinally curved section.

11. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, said means for positioning comprising means for indicating motion of the vehicle along said curved section, and lateral drive means responsive to said means for indicating for transversely shifting the vehicle partly around said guideway.

12. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, said means for positioning comprising acceleration means for sensing centrifugal acceleration of said vehicle, and transverse drive means responsive to said acceleration means for transversely moving the vehicle partly around said guideway.

13. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, said track comprising an elongated guide tube having track walls, a plurality of longitudinally extending tension cables mutually spaced around said guide tube and fixed to said track wall at longitudinally spaced points, and means for adjusting the lengths of at least some of said cables between said points to control longitudinal configuration of the track.

14. A tracked vehicle system comprising:

a track including a longitudinally extending guideway having an upwardly convex transverse curvature, said track having a longitudinally curved section, a vehicle means for supporting said vehicle on said guideway for longitudinal and transverse motion relative to the track, means for propelling the vehicle longitudinally along the track, and means for positioning the vehicle transversely around said guideway toward an inward side of the track curved section to provide a banked position of the vehicle as it travels along the track curved section, said track comprising an elongated guide tube of substantially circular cross section having a longitudinally extending guide slot in an upper part thereof, said means for propelling comprising a linear motor secured to said tube, said motor including a linear tubular stator within said tube, said stator having a stator slot registered with said guide slot, said motor including a linear rotor mounted in said tubular stator to be driven along said stator and track, a riser fixed to said rotor and extending upwardly through both said slots, a saddle fixed to said vehicle and supported on said track for longitudinal and transverse motion relative to the track, and a longitudinal drive connection between said saddle and said riser, said means for positioning comprising means for driving said saddle transversely around said track.

15. The system of claim 14 wherein said track includes a straight section, and wherein said stator and guide slots are aligned with each other in a direction that is vertical at said straight section and in a direction that is inclined to the vertical at said longitudinally curved section.

16. A tracked vehicle system comprising:

an elongated track having at least one longitudinally curved section, said track having a cross section including a transversely curved upwardly convex guideway, a vehicle having a center of gravity, means for supporting the vehicle from the track with said center of gravity above the track guideway for longitudinal motion along the track guideway and for limited transverse motion about the track guideway, propulsion means for driving the vehicle along the track guideway, and means for shifting the vehicle transversely around the track guideway when the vehicle is at said curved track section, whereby the vehicle is banked at said curved track section.

17. The system of claim 16 wherein said guideway has a circular transverse curvature, and wherein said mean for shifting comprise means for rotating the vehicle transversely around the center of curvature of the circularly curved guideway.

18. The system of claim 16 wherein said propulsion means comprises a linear motor having a stator fixed to said track guideway and having a longitudinally driven rotor, said means for supporting the vehicle from the track comprising a saddle connected to the vehicle and extending transversely about a portion of said track guideway, and means for connecting the saddle to the rotor for longitudinal motion with the rotor and for limited transverse motion relative to the rotor.

19. The system of claim 16 wherein said means for shifting comprises means for indicating motion of the vehicle along said curved section, and lateral drive means responsive to said means for indicating for transversely shifting the vehicle partly around said convex guideway.

20. The system of claim 16 wherein said means for shifting comprises acceleration means for sensing centrifugal acceleration of said vehicle, and transverse drive means responsive to said acceleration means for transversely moving the vehicle partly around said guideway.

21. The system of claim 16, wherein said track comprises an elongated guide tube having track walls, a plurality of longitudinally extending tension cables mutually spaced around said guide tube and fixed to said track wall at longitudinally spaced points, and means for adjusting the lengths of at least some of said cables between said points.

22. The system of claim 16 wherein said track guideway has a longitudinally extending slot, and including a driver member mounted below said track guideway and having a riser extending upwardly through said slot, a drive member fixed to said riser above said track guideway and a saddle fixed to the vehicle and connected to be driven by said drive member.

23. The system of claim 16 wherein said track guideway has a longitudinally extending slot offset from the center of said guideway at said longitudinally curved section, a riser extending through said slot, and means for connecting said riser to said vehicle above said track guideway.

24. The system of claim 16 wherein said means for shifting the vehicle transversely comprise a saddle connected to the vehicle and extending transversely about a portion of said guideway, means for connecting the saddle to said propulsion means for driving the saddle longitudinally along the track guideway, and means for connecting the saddle to said propulsion means for limited transverse motion of the saddle relative to the propulsion means.

25. The system of claim 23 wherein said means for shifting the vehicle comprises said riser and said slot.

26. A tracked vehicle system comprising:

an elongated track having a transversely curved guideway that is upwardly convex, a longitudinally extending guide slot in said guideway, a linear motor comprising:

a stator fixed to said track beneath said guideway, said stator having a longitudinally extending stator slot in registration with said guide slot, a riser extending through said guide slot, rotor means for driving the riser along said guideway, a drive member fixed to said riser above said guideway, a vehicle supported for motion along said guideway, and means for connecting the vehicle to said drive member to be driven along the guideway with the riser.

27. The system of claim 26 wherein said means for connecting the vehicle comprises means for providing limited transverse motion of said vehicle in an arcuate path relative to said drive member.

28. The system of claim 27 wherein said guideway is transversely circularly curved and including means for banking the vehicle by driving it in a circular path transversely of said drive member.

29. The system of claim 26 wherein said means for connecting the vehicle to said drive member comprises a transversely curved guide saddle, means for magnetically supporting the saddle from the guideway, said saddle being slidably connected to said drive member for motion in a limited transversely curved path relative to said drive member and around said guideway.

30. A tracked vehicle system comprising:

an elongated track having at least one longitudinally curved section, said track section having a longitudinally extending guideway, a longitudinally extending guide slot in said guideway, said guide slot being transversely offset at said longitudinally curved section from an upper portion of said guideway toward an inner side of the longitudinally curved section, a riser extending through said guide slot, a vehicle supported for longitudinal motion along said guideway, means for driving the vehicle longitudinally along the guideway, and means for connecting the vehicle to said riser for guiding the vehicle along the guideway.

31. A tracked vehicle system comprising:

an elongated track having at least one longitudinally curved section, said track section having a guideway that is transversely curved about a center of curvature below the guideway, a vehicle supported for motion along said guideway, said vehicle having a center of gravity above said center of curvature, and means for banking said vehicle at said curved section, said means for banking comprising means for transversely shifting said vehicle in a curved path relative to said guideway.

32. A tracked vehicle system comprising:

an elongated track having at least one longitudinally curved section, said track section having a guideway that is transversely curved about a center of curvature below the guideway, a vehicle supported for motion along said guideway, and means for banking said vehicle at said curved section, said means for banking comprising means for transversely shifting said vehicle in a curved path relative to said guideway, said means for banking including a longitudinal slot formed in said guideway, said slot being transversely offset at said curved portion, and a riser extending through said slot and connected to said vehicle.

33. A tracked vehicle system comprising:

an elongated track having at least one longitudinally curved section, said track section having a guideway that is transversely curved about a center of curvature below the guideway, a vehicle supported for motion along said guideway, and means for banking said vehicle at said curved section, said means for banking comprising means for transversely shifting said vehicle in a curved path relative to said guideway, said guideway being transversely circularly curved, and including a drive member, means for propelling the drive member along said track, a saddle, means for transmitting thrust from the drive member to said saddle, and means for mounting the saddle to the drive member for transverse motion relative to said guideway in a circular path about the center of curvature of said guideway.

34. The system of claim 33 wherein said means for propelling comprises a linear motor stator mounted below said track, a rotor mounted adjacent the stator below said track to be driven along the track, a longitudinal slot formed in said track, and a riser extending through said track and connected to said rotor to said drive member.

35. The system of claim 34 wherein said drive member includes a transverse drive arm, said saddle comprising an outrigger bridge extending transversely along said drive arm, means for mounting the bridge for transverse motion relative to the drive arm, means for transferring longitudinal thrust from said drive arm to said bridge, means for supporting outer end portions of said bridge from said guideway for transverse and longitudinal motion relative to said guideway, and means for mounting said vehicle to said bridge for motion therewith.

36. The system of claim 32 including outer support means carried by the vehicle for supporting the vehicle from an outer surface of the track, said track having an inner surface, and inner support means carried by said riser for bearing against said inner surface.

37. A tracked vehicle system comprising:

an elongated track having at least one longitudinally curved section, said track section having a guideway, a vehicle supported for motion along said guideway, and means for banking said vehicle at said curved section, said means for banking comprising a longitudinal slot formed in said guideway, said slot being transversely and angularly offset at said curved portion, and a riser extending through said slot and connected to said vehicle.

* * * * *